United States Patent [19]

El-Hamamsy

[11] Patent Number: 5,153,484
[45] Date of Patent: Oct. 6, 1992

[54] ELECTRODELESS HIGH INTENSITY DISCHARGE LAMP EXCITATION COIL AND BALLAST CONFIGURATION FOR MAXIMUM EFFICIENCY

[75] Inventor: Sayed-Amr A. El-Hamamsy, Schenectady, N.Y.

[73] Assignee: General Electric Company, Schenectady, N.Y.

[21] Appl. No.: 786,219

[22] Filed: Oct. 31, 1991

[51] Int. Cl.$^5$ .............................. H05B 41/16
[52] U.S. Cl. ................... 315/248; 315/344
[58] Field of Search ............ 315/248, 344, 39; 313/160, 46, 607, 234, 153; 362/362

[56] References Cited

U.S. PATENT DOCUMENTS

| | | | |
|---|---|---|---|
| 4,383,203 | 5/1983 | Stanley | 315/248 |
| 4,812,702 | 3/1989 | Anderson | 313/153 |
| 4,894,591 | 1/1990 | Witting | 315/248 |
| 4,910,439 | 3/1990 | El-Hamamsy | 315/248 |
| 5,023,566 | 6/1991 | El-Hamamsy | 330/251 |
| 5,039,903 | 8/1991 | Farrall | 313/160 |
| 5,043,859 | 8/1991 | Korman et al. | 363/147 |
| 5,047,692 | 9/1991 | Borowiec et al. | 315/248 |
| 5,057,750 | 10/1991 | Farrall | 315/248 |
| 5,075,600 | 12/1991 | El-Hamamsy | 315/248 |

Primary Examiner—Eugene R. LaRoche
Assistant Examiner—A. Zarabian
Attorney, Agent, or Firm—Jill M. Breedlove; Marvin Snyder

[57] ABSTRACT

An electrodeless high intensity discharge (HID) lamp system includes a ballast housing constructed from a thermally conductive material for containing a ballast of a type having at least one RF power switching device. The RF switching device is thermally coupled to the ballast housing to provide heat sinking therefor. The excitation coil of the HID lamp is also thermally coupled to said ballast housing via thermally-conductive coil mounting studs, but is electrically insulated therefrom. An opening in the ballast housing enables the electrical connection of the coil to the output circuit of the ballast. The RF power switching device and the excitation coil are arranged so as to be spaced apart sufficiently in order to maintain the ballast housing temperature substantially uniform during operation of said lamp, thereby maximizing lamp efficiency and increasing the useful life of the lamp and ballast.

6 Claims, 6 Drawing Sheets

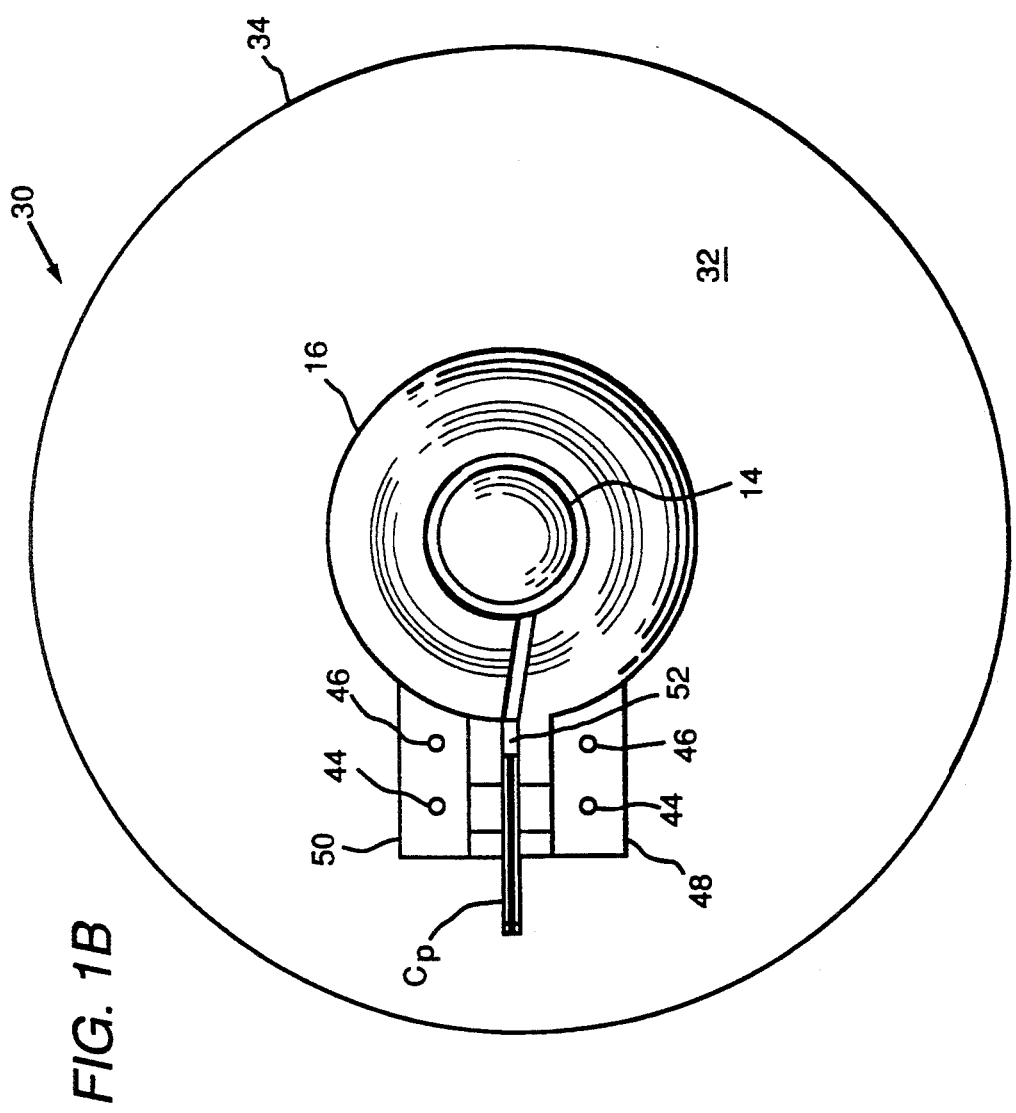

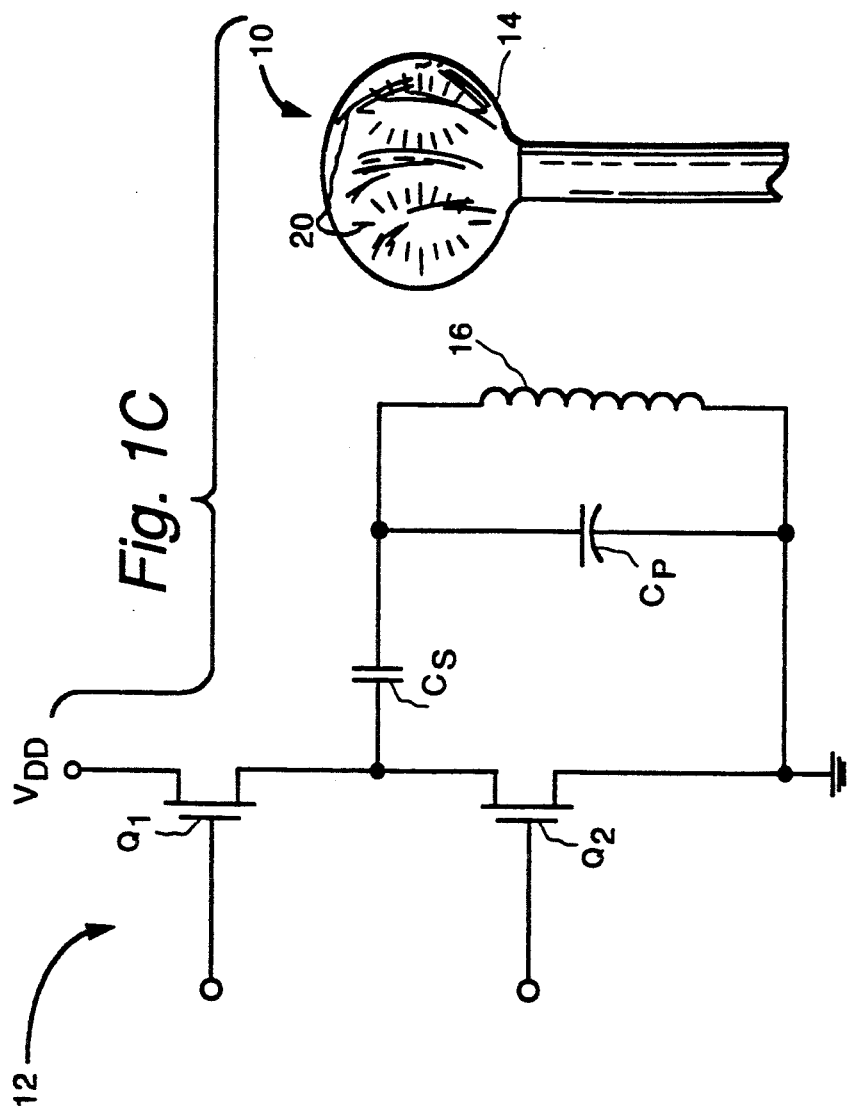

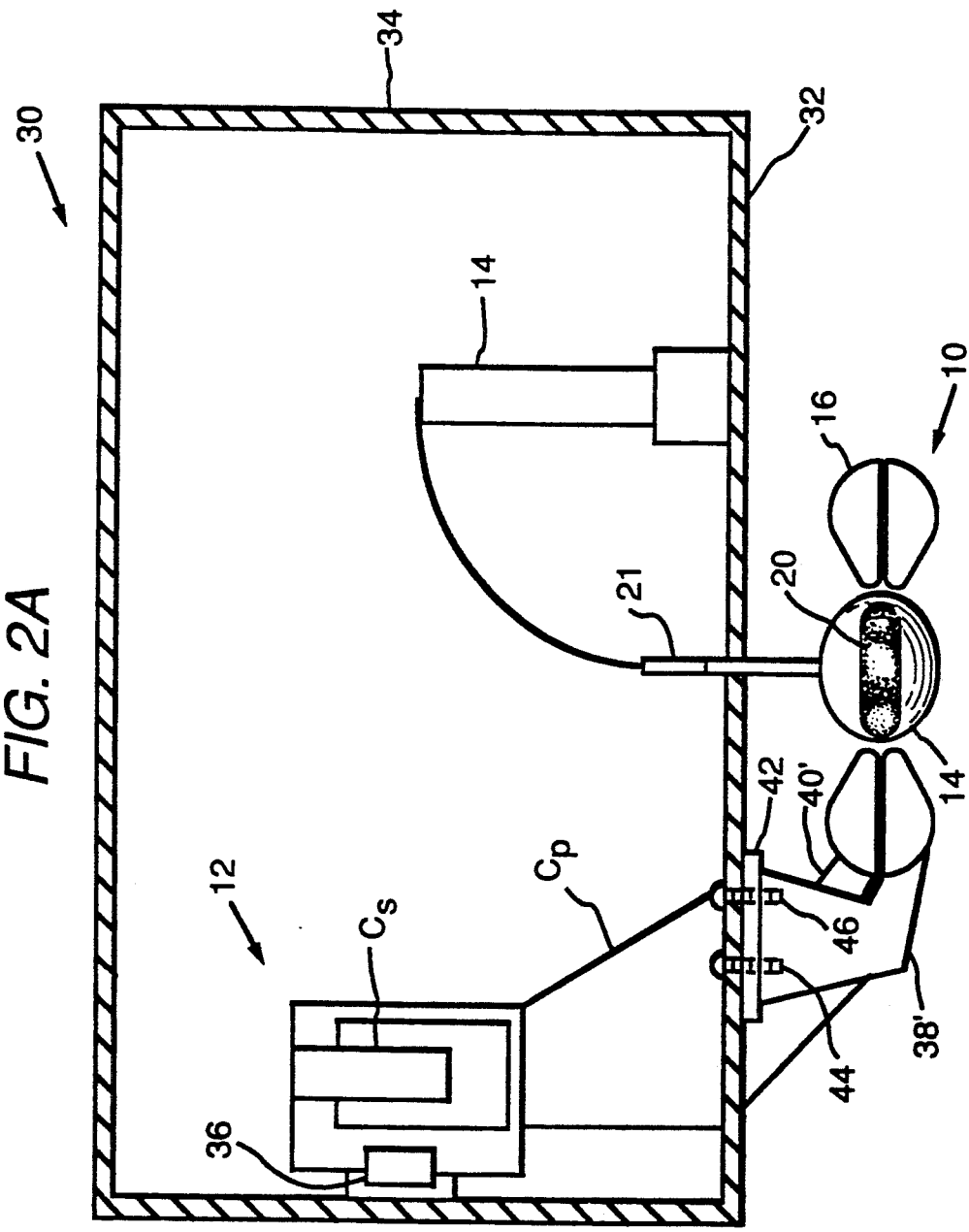

ELECTRODELESS HIGH INTENSITY DISCHARGE LAMP EXCITATION COIL AND BALLAST CONFIGURATION FOR MAXIMUM EFFICIENCY

FIELD OF THE INVENTION

The present invention relates generally to electrodeless high intensity discharge lamps More particularly, the present invention relates to an excitation coil and ballast arrangement resulting in both highly effective heat sinking and high-efficiency lamp operation.

BACKGROUND OF THE INVENTION

In a high intensity discharge (HID) lamp, a medium to high pressure ionizable gas, such as mercury or sodium vapor, emits visible radiation upon excitation typically caused by passage of current through the gas. One class of HID lamps comprises electrodeless lamps which generate an arc discharge by generating a solenoidal electric field in a high-pressure gaseous lamp fill. In particular, the lamp fill, or discharge plasma, is excited by radio frequency (RF) current in an excitation coil surrounding an arc tube. The arc tube and excitation coil assembly acts essentially as a transformer which couples RF energy to the plasma. That is, the excitation coil acts as a primary coil, and the plasma functions as a single-turn secondary. RF current in the excitation coil produces a time-varying magnetic field, in turn creating an electric field in the plasma which closes completely upon itself, i.e., a solenoidal electric field Current flows as a result of this electric field, resulting in a toroidal arc discharge in the arc tube.

A high frequency ballast is required to convert ac power line frequencies to the radio frequencies necessary to induce an arc discharge in the fill within the arc tube of an electrodeless HID lamp. An exemplary ballast comprises a Class-D power amplifier, such as that described in commonly assigned U.S. Pat. No. 5,047,692 of J. C. Borowiec and S. A. El-Hamamsy, issued Sep. 10, 1991. The power switching devices of the ballast require effective heat sinking in order to protect the junctions thereof from excessive temperature rises which would otherwise increase the device resistance, and hence decrease efficiency. Furthermore, operating the power switching devices at excessively high temperatures reduces the useful life thereof.

The excitation coil of an HID lamp requires effectual heat sinking in order to maximize efficiency of the system. In particular, the excitation coil of an electrodeless HID lamp surrounds the arc tube. As a result, the coefficient of electromagnetic coupling between the coil and the solenoidal discharge is relatively low, typically in the range from about 0.2 to 0.4. Therefore, in order to produce a predetermined discharge current in the arc tube, an even larger current is required in the coil. The relatively large coil current results in resistive losses in the coil that can have a significant deleterious effect on efficiency of the overall HID lamp system. Moreover, as the temperature of the excitation coil increases, coil resistance increases. Hence, to increase efficiency of an electrodeless HID lamp system, heat resulting from coil resistive losses and from convection and radiation from the hot arc tube to the coil must be removed.

In addition to the heat sinking requirements of the excitation coil and the ballast, a low-inductance electrical connection from the coil to the ballast is required in order to maximize efficiency. Furthermore, an impedance matching network is required to match the coil impedance to the ballast. Accordingly, it is desirable to provide a ballast and excitation coil configuration which is suitable for use in an electrodeless HID lamp fixture, which configuration optimizes both the heat-sinking and electrical requirements of the system and hence maximizes efficiency of the lamp and increases the useful life thereof.

SUMMARY OF THE INVENTION

An electrodeless HID lamp system includes a ballast housing comprised of a thermally conductive material for containing a ballast of a type having at least one RF power switching device The RF switching device is thermally coupled to the ballast housing to provide heat sinking therefor. The excitation coil of the HID lamp is also thermally coupled to the ballast housing via thermally-conductive coil mounting studs, but is electrically insulated therefrom. An opening in the ballast housing enables the electrical connection of the coil to the output circuit of the ballast. The RF power switching device and the excitation coil are arranged so as to be spaced apart sufficiently in order to maintain the ballast housing temperature substantially uniform during operation of said lamp, thereby maximizing system efficiency.

BRIEF DESCRIPTION OF THE DRAWINGS

The features and advantages of the present invention will become apparent from the following detailed description of the invention when read with the accompanying drawings in which:

FIG. 1B is a bottom view of the electrodeless HID lamp system of FIG. 1A;

FIG. 1C is a schematic illustration of the lamp system of FIG. 1A;

FIG. 2A is a side cross sectional, partly schematic view illustrating an alternative embodiment of an electrodeless HID lamp system in accordance with the present invention;

DETAILED DESCRIPTION OF THE INVENTION

Figure 1A:
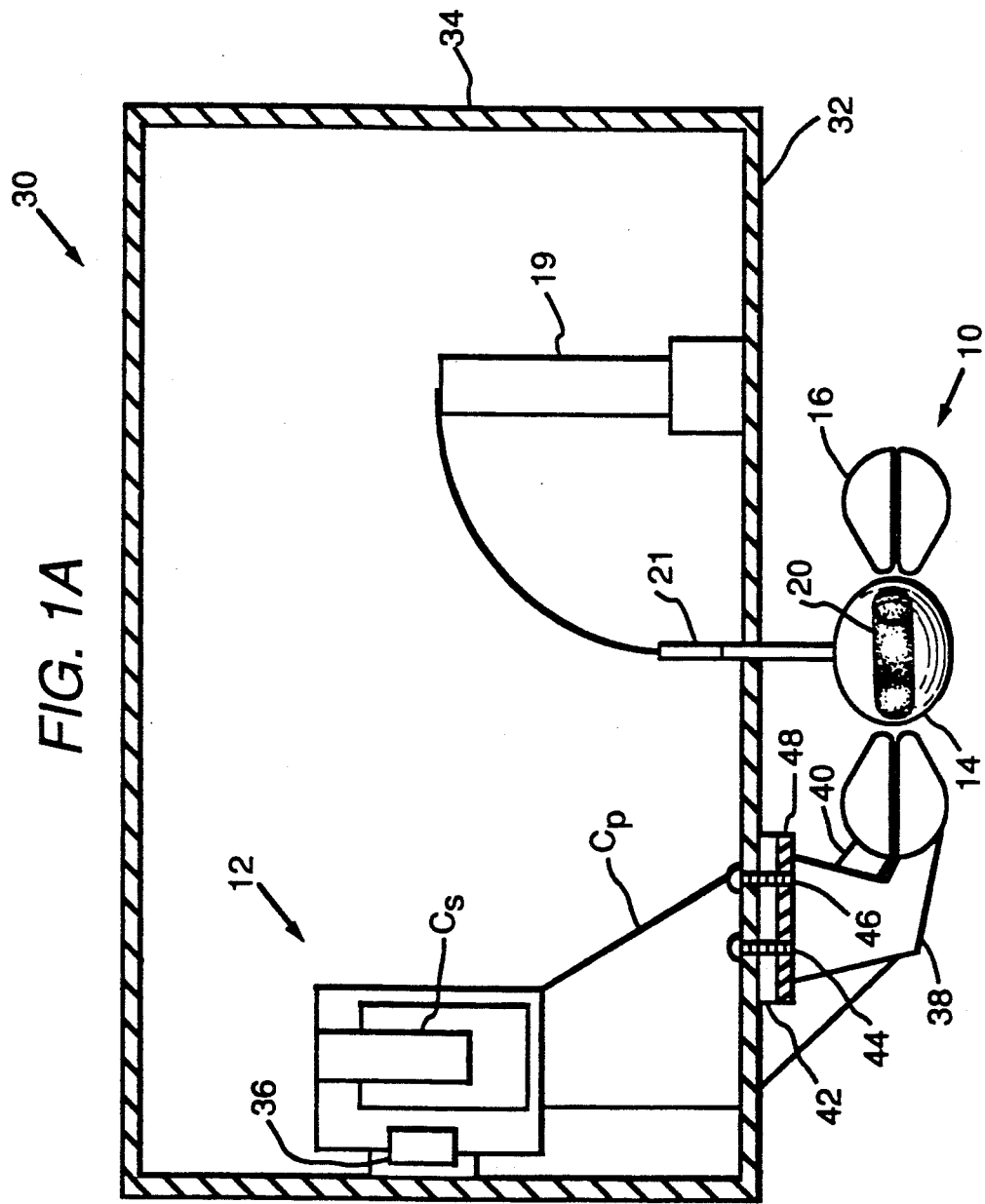
FIG. 1A is a side cross sectional, partly schematic view illustrating a preferred embodiment of an electrodeless HID lamp system in accordance with the present invention.

FIGS. 1A-1C illustrates an electrodeless HID lamp system according to a preferred embodiment of the present invention. As shown, an electrodeless HID lamp 10 includes an arc tube 14 formed of a high-temperature glass, such as fused quartz, or an optically transparent ceramic, such as polycrystalline alumina. Arc tube 14 contains a fill which may comprise at least one metal halide, such as sodium iodide, and a buffer gas, such as xenon. Electrical power is applied to the HID lamp by an excitation coil 16 disposed about arc tube 14 which is driven by an RF signal via a ballast 12. A suitable excitation coil 16 may comprise, for example, a two-turn coil having a configuration such as that described in commonly assigned U.S. Pat. No. 5,039,903 of G. A. Farrall, issued Aug. 13, 1991, which is incorporated by reference herein. Such a coil configuration results in very high efficiency and causes only minimal blockage of light from the lamp. The overall shape of the excitation coil of the Farrall patent is generally that of a surface formed by rotating a bilaterally symmetrical trapezoid about a coil center line situated in the same plane as the trapezoid, but which line does not intersect the trapezoid. However, another suitable coil configuration is described in commonly assigned U.S. Pat. No. 4,812,702 of J. M. Anderson, issued Mar. 14, 1989, which patent is incorporated by reference herein. In particular, the Anderson patent describes a coil having six turns which are arranged to have a substantially V-shaped cross section on each side of a coil center line. Still another suitable excitation coil may be of solenoidal shape, for example.

In operation, RF current in coil 16 results in a time-varying magnetic field which produces within arc tube 14 an electric field that completely closes upon itself, i.e., a solenoidal electric field At room temperature, however, the solenoidal electric field is typically not high enough to ionize the gaseous fill and thus initiate the arc discharge. Hence, an electrodeless HID lamp system typically includes a starting circuit 19 for providing a starting voltage, via a starting probe 21, of sufficient magnitude to initiate a toroidal arc discharge 20 in arc tube 14. Suitable starting circuits are described in commonly assigned U.S. Pat. No. 5,057,750 of Farrall et al., issued Oct. 15, 1991, and commonly assigned U.S. Pat. No. 5,103,140 of Cocoma et al., issued Apr. 7, 1992, and commonly assigned U.S. patent application of El-Hamamsy et al., Ser. No. 719,855, filed Jun. 24, 1991, now allowed. The cited patent applications are incorporated by reference herein.

As mentioned hereinabove, a suitable ballast 12 comprises a Class-D power amplifier. Such, a Class-D ballast, shown schematically in FIG. 1C, includes two RF power switching devices $Q_1$ and $Q_2$ connected in series with a dc power supply in a half-bridge configuration. Suitable power switching devices include MOSFET's, but other types of switching devices having capacitive gates may be used, such as insulated gate bipolar transistors (IGBT's) or MOS-controlled thyristors (MCT's). In operation, the switching devices are driven alternately between cutoff and saturation such that one is conducting while the other one is turned off and vice versa. Hence, the Class-D ballast may be conveniently driven by a square wave signal. Alternatively, the ballast may be driven by two out-of-phase sinusoidal signals, as described in commonly assigned U.S. Pat. No. 5,023,566 of S. A. El-Hamamsy and G. Jernakoff, issued Jun. 11, 1991, which patent is incorporated by reference herein.

As in any Class-D circuit, a resonant load network is connected to the half-bridge at the junction between the switching devices. Such a resonant load network may comprise a series, parallel or series/parallel resonant circuit, depending on the application. In the exemplary HID lamp system, as illustrated in FIGS. 1A–1C, the resonant load network includes a series capacitor $C_s$ which is employed both for resonant circuit tuning and blocking dc voltage, as described in U.S. Pat. No. 5,047,692, cited hereinabove. Capacitor $C_s$ is connected in series with the parallel combination of the excitation coil 16 of HID lamp 10 and a parallel tuning capacitor $C_p$. The parallel combination of capacitor $C_p$ and coil 16 functions as an impedance transformer to reflect the impedance of the arc discharge 20 into the ballast load.

As described in Borowiec et al. U.S. Pat. No. 5,047,692, cited hereinabove, capacitors $C_s$ and $C_p$ are chosen to ensure impedance matching for maximum efficiency. That is, these capacitors are chosen to ensure that the ballast load is designed for optimum values of resistance and phase angle. The excitation coil of the HID lamp acts as the primary of a loosely-coupled transformer, while the arc discharge acts as both a single-turn secondary and secondary load. The impedance of the arc discharge is reflected to the primary, or excitation coil, side of this loosely-coupled transformer. To match the ballast load impedance for maximum efficiency, the parallel capacitor operates with the excitation coil to match the proper resistive load value, and the series capacitor acts with the combination of the excitation coil and parallel capacitor to yield the required phase angle.

In accordance with the present invention, the excitation coil and ballast elements are arranged and configured so as to provide highly effective heat sinking of the RF power switching devices and the excitation coil, thereby increasing the useful life of the lamp and ballast, while maximizing efficiency of the lamp. In particular, the thermal and electrical requirements of the system are optimized separately in order to maximize both the useful life of the lamp and lamp efficiency.

As shown in FIG. 1A, a ballast housing 30 contains ballast 12 and starting circuit 19. Ballast housing 30 is constructed from a thermally conductive material such as, for example, aluminum. The bottom, or base, plate 32 of ballast housing 30 is made sufficiently thick such that its thermal impedance to the side 34 of the housing is small. The RF power switching devices are packaged, as represented by block 36, and mounted to ballast housing 30. An exemplary device packaging scheme is described in commonly assigned U.S. Pat. No. 5,043,859 of Korman et al., issued Aug. 27, 1991, which is incorporated by reference herein. Excitation coil 16 is mounted to ballast housing 30 by relatively thick, thermally conductive coil mounting studs 38 and 40. The high voltage side of coil 16 is electrically insulated from ballast housing 30 by a thermally conducting, electrical insulator 42 made of, for example, alumina or Teflon synthetic resin polymers. The ground side of the coil may be directly connected to the ballast housing as long as the RF ballast output is electrically isolated from the line voltage, since the ballast housing is grounded. Coil mounting studs 38 and 40 are attached to the housing by non-conductive screws 44 and 46 that extend through each of flanges 48 and 50 (FIG. 1B) of mounting studs 38 and 40, respectively. In addition, if desired, a small gap (not shown) could be situated between base plate 32 and housing 30 near the portion of the housing where ballast 12 is mounted, if desired, as a further reduction in the ballast mounting surface temperature.

Figure 2B:
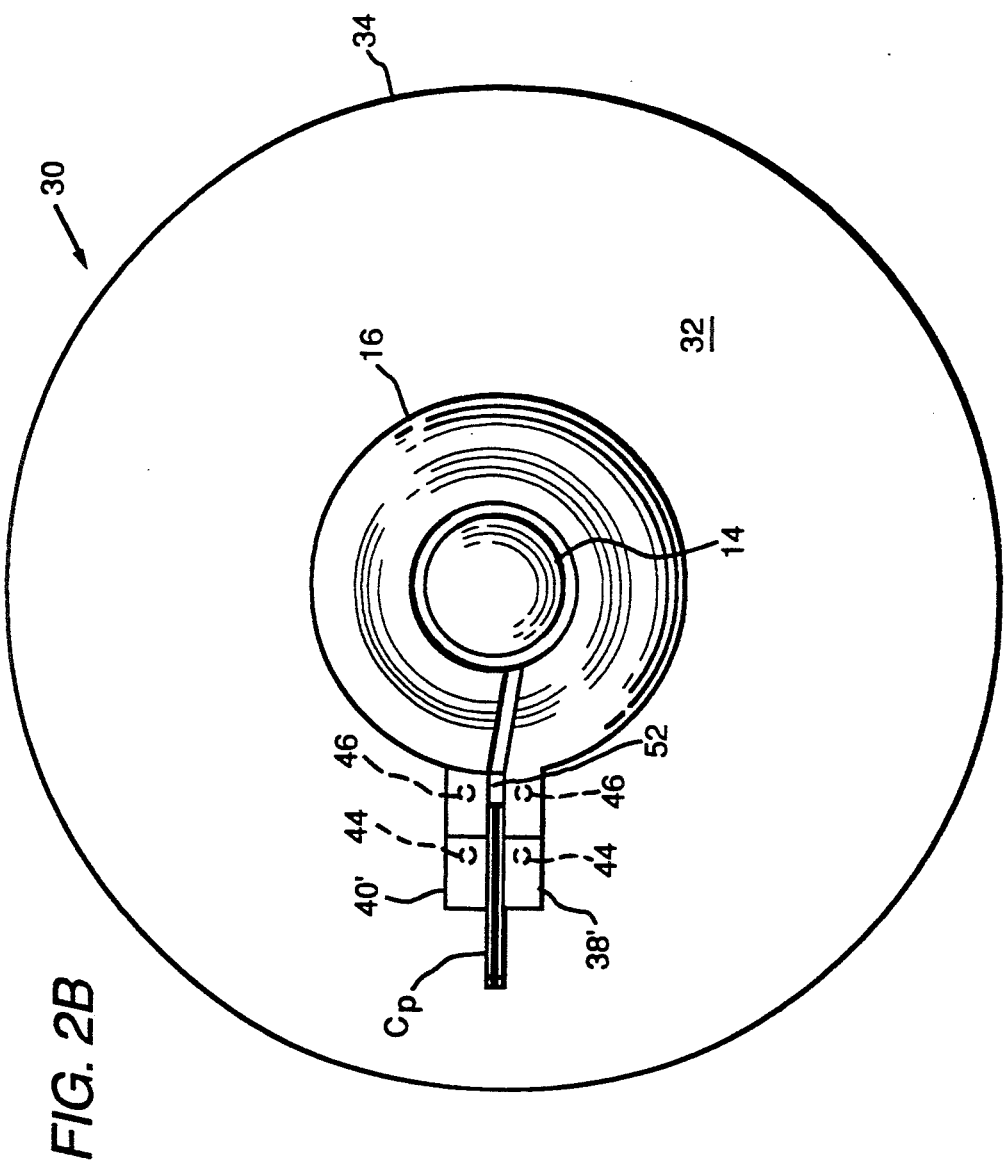
FIG. 2B is a bottom view of the electrodeless HID lamp system of FIG. 2A.

Instead of using flanged coil mounting studs 38 and as shown in FIG. 1A, coil mounting studs 38' and 40' without flanges may be used, if desired, as shown in FIGS. 2A–2B. Coil mounting studs without flanges would be less expensive to manufacture; however, the thermal contact with ballast housing 30 would be slightly less effective. Alternatively, if the base plate 32 of housing is at RF ground potential, then it may be advantageous to use one coil mounting stud with a flange for connecting the ground side of the coil to the housing and one coil mounting stud without a flange for electrically connecting the high voltage side of the coil to the ballast.

In order to provide a low-inductance connection to excitation coil 16 from ballast 12, a slit 52 is made in base plate 32 between the coil mounting studs. Parallel capacitor $C_p$ extends through slit 52 to provide the electrical connection and the matching capacitance. The direct on between the capacitor $C_p$ and coil 16 eliminates the need for electrical leads, thus minimizing the inductance therebetween. The plates of capacitor $C_p$ are soldered to the coil mounting studs. Preferably, the parallel plates of capacitor $C_p$ are laminated, e.g., made from a metal/dielectric laminate. A suitable laminate is comprised of, for example, copper and a synthetic resin polymer film such as that sold under the trademark Cuflon by Polyflon Corporation. Such a laminated capacitor does not require mechanical means to hold the parallel plates together, thereby simplifying assembly.

Figure 3A:
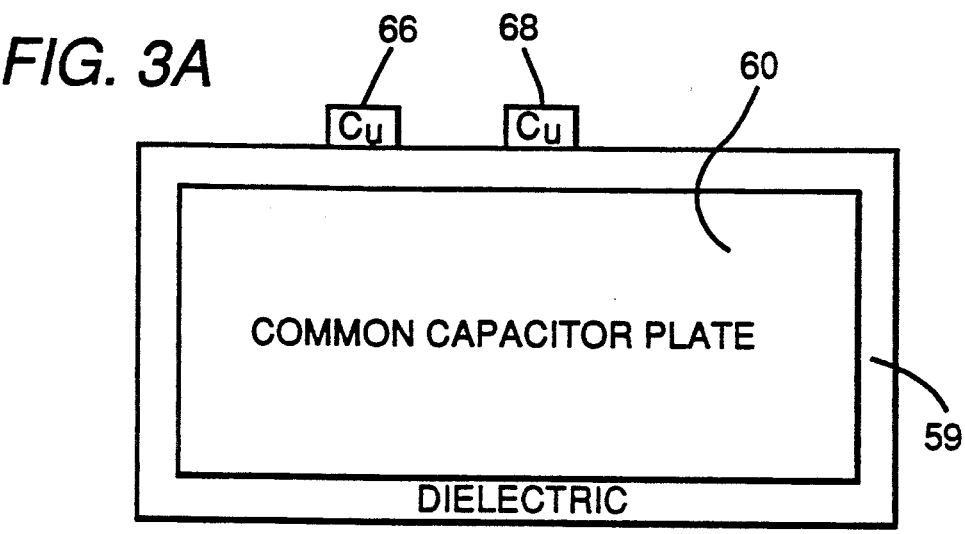
FIGS. 3A and 3B are alternate side views.
Figure 3B:
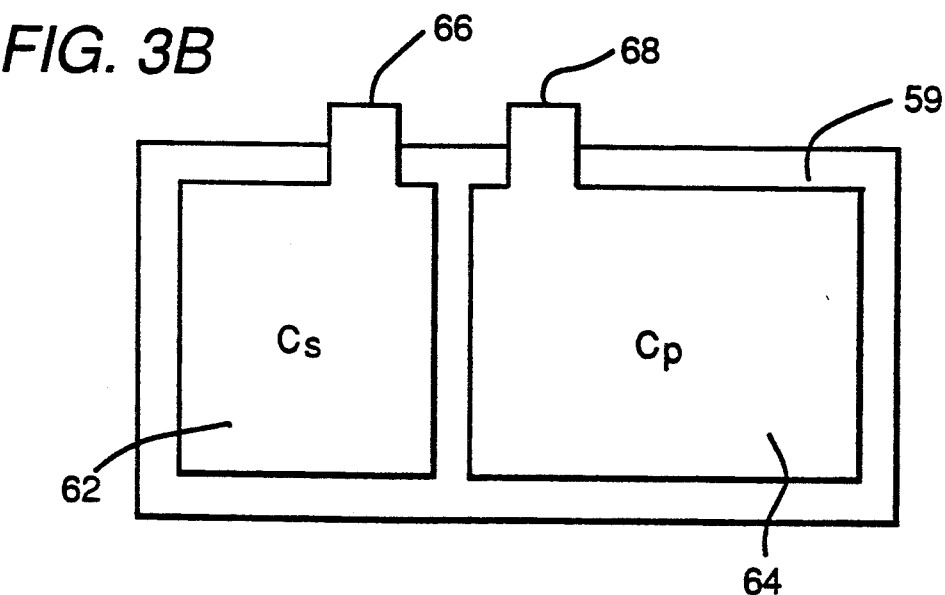
Figure 3C:
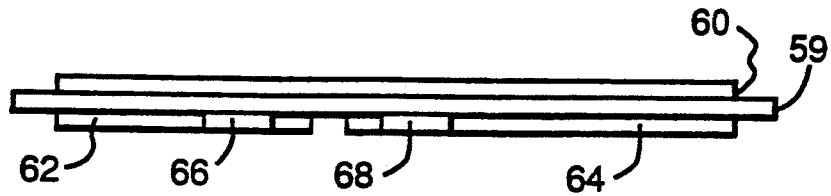
FIG. 3C is a top view, of a preferred capacitor structure useful in the ballast configuration of the present invention

According to one preferred embodiment, series capacitor $C_s$ and parallel capacitor $C_p$ are integrated in one structure, as illustrated in FIG. 3A-3C. The copper film patterns are formed by etching the copper on both sides of a laminate having a layer of copper laminated to both sides of a dielectric membrane 59. In the structure of FIGS. 3A-3C series capacitor $C_s$ and parallel capacitor $C_p$ share a common plate 60 comprising the etched copper film pattern on one side of the laminate. The other plate 62 and 64, respectively, of each of capacitors $C_s$ and $C_p$, respectively, are etched on the other side of the laminate. Copper tabs 66 and 68 are provided for connection to the ballast. It is to be understood that although FIG. 3A-3C shows capacitors $C_s$ and $C_p$ as having substantially rectangular shapes, other capacitor shapes may be suitable, depending upon the connection requirements to the coil and/or the length of slit 52 (FIGS. 1 and 2).

Advantageously, by the excitation coil and ballast configuration of the present invention, heat removed from the coil during lamp operation is distributed substantially evenly around the ballast housing via bottom plate.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. An electrodeless HID lamp system, comprising:
   an electrodeless HID lamp having an excitation coil situated about an arc tube containing an ionizable fill;
   a ballast for coupling an RF signal to said excitation coil for exciting an arc discharge in said fill, said ballast including at least one RF power switching device and an output resonant circuit, said ballast further including impedance matching means for matching the ballast load impedance to maximize efficiency, said impedance matching means comprising a first capacitor coupled in parallel with said excitation coil and a second capacitor coupled in series with the parallel combination of said first capacitor and said excitation coil, said impedance matching means being directly connected to said excitation coil so as to minimize inductance therebetween;
   a ballast housing for containing said ballast, said ballast housing being comprised of a thermally-conductive material, said excitation coil being thermally coupled to said ballast housing and electrically insulated therefrom, said RF power switching device also being thermally coupled to said ballast housing, said RF power switching device and said excitation coil being spaced apart sufficiently so that said ballast housing temperature is substantially uniform during operation of said lamp.

2. The HID lamp system of claim 1 wherein said excitation coil is mounted to said ballast housing by at least one thermally-conductive coil mounting stud, a thermally-conductive and electrically-insulative material being inserted between said coil mounting stud and said ballast housing.

3. The HID lamp system of claim 1 wherein said ballast comprises a Class-D power amplifier circuit having two RF power switching devices coupled together in a half-bridge configuration.

4. The HID lamp system of claim 1, further including a starting circuit contained within said ballast housing.

5. The HID lamp system of claim 1 wherein said first and second capacitors are integrated into a single capacitor structure, said capacitor structure having a conductive film laminated on each side of a dielectric membrane, said first and second capacitors sharing a common conductive plate, said common conductive plate being etched in the conductive film on one of said sides of said dielectric membrane, said first and second capacitors each having another conductive plate etched in the conductive film on the other side of said dielectric membrane so that the other conductive plate of each of said first and second capacitors are electrically insulated from each other.

6. The HID lamp system of claim 1 wherein said ballast housing further comprises an opening for directly connecting said first capacitor to said excitation coil, said first capacitor extending through said opening.

* * * * *